(12) United States Patent
King

(10) Patent No.: US 7,645,982 B1
(45) Date of Patent: Jan. 12, 2010

(54) CALIBRATED, VARIABLE OUTPUT, HIGH ENERGY LASER SOURCE

(75) Inventor: Daniel Wayne King, Riverside, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/427,634

(22) Filed: Apr. 21, 2009

(51) Int. Cl.
*G01D 18/00* (2006.01)
*H01S 3/00* (2006.01)

(52) U.S. Cl. .................. 250/252.1; 372/109; 250/493.1

(58) Field of Classification Search ............. 250/252.1, 250/493.1, 503.1; 372/109
See application file for complete search history.

(56) References Cited

U.S. PATENT DOCUMENTS

2002/0012368 A1* 1/2002 Kleinschmidt et al. ........ 372/32

* cited by examiner

*Primary Examiner*—David P Porta
*Assistant Examiner*—Mark R Gaworecki
(74) *Attorney, Agent, or Firm*—Blakely, Sokoloff, Taylor & Zafman LLP

(57) ABSTRACT

A system and method for calibrating laser designator and rangefinder test sets. The system includes a high speed detector module which receives a laser input signal, and outputs a laser output signal and an electrical pulse shaped output. A variable attenuator module receives the laser output signal and includes a rotating waveplate which rotates a polarization of the received laser output signal and a Glan laser polarizing beam splitter which receives the rotated laser output signal. The polarizing beam splitter passes only vertically polarized portions of the rotated laser output signal. An energy detector module receives the vertically polarized portions of the rotated laser output signal and includes a beam splitter which splits the vertically polarized portions of the rotated laser output signal into a first path pulse and a second path pulse. The second path pulse and the electrical pulse shaped output are used to calibrate a laser designator/rangefinder test set.

13 Claims, 3 Drawing Sheets

CALIBRATED, VARIABLE OUTPUT, HIGH ENERGY LASER SOURCE

BACKGROUND OF THE INVENTION

Military laser designators are tested and supported by electro-optic test sets. These test sets require support and calibration. The present invention was developed through the NAVSEA R&D to calibrate these test sets. The invention provides a calibrated laser energy and pulse width source at variable high power levels at a wavelength of 1.064 μm, as well as 1.54 μm and 1.57 μm wavelengths with the use of adapters.

There is no known instrument that can output a calibrated and variable high energy laser source of pulsed 1.064 μm, 1.54 μm and 1.57 μm wavelength with real time monitoring of pulse width and energy.

BRIEF SUMMARY OF THE INVENTION

The invented laser source was developed at the Naval Warfare Assessment Station for calibration support of laser designator and rangefinder test sets. The unit is versatile enough to accommodate different test set requirements with a range of pulse-widths, energy levels, input characteristics, fields of view and polarization sensitivities. It also supports the boresighting of FUR to laser alignment test sets.

The output of the invented laser source is monitored in real-time for energy and pulse-width. A NIST traceable energy monitor can perform statistical analysis on a predetermined number of pulses or display energy values for each pulse as it exits. The pulse width can be varied to suit a desired application via a remote controller which can also control lasing, repetition rate, number of pulses to be fired, etc. The invented laser source can be used as a compact laser system in a laboratory setting or in the field with adapters to eliminate the need for light tight rooms and laser safety eyewear.

The essential elements of the system are a variable attenuation and monitoring package, which includes a beam splitter, to monitor the pulse width, a rotatable zero order half waveplate with Glan laser polarizing beam-splitter which is turned by 90 degrees for vertical polarized output to attenuate the energy, and a final beam splitter to monitor energy.

The invented laser source can be used as a variable 1.064 μm wavelength pulsed laser energy standard for 250 mJ-0.1 mJ at 5% accuracy and pulse widths from 18-35 ns with a linearly polarized output of 40,000:1. Beam expanders with a 7× or 5× multiplier can be used for larger output beam requirements. 1.57 μm and 1.54 μm wavelength adapters enable the system to be used at all three wavelengths. Polarization at the 1.5 μm wavelengths is 100:1. The energy range at 1.57 μm and 1.54 μm wavelengths is 25-40 mJ for both. With a telescope attachment, the resulting device can be used as a boresight tool.

In one embodiment, positioning of the rotating waveplate is obtained by using a motor with controls to step it up or down thus controlling the attenuator electronically. Otherwise, it is necessary to position the waveplate manually. A desirable capability for the functionality provided by the invention is portability so it can be used by onsite calibration teams.

The invented laser system is accurate enough for a laboratory setting and versatile enough for the field, with adapters to eliminate the need for light tight rooms and laser safety eyewear. The telescope module can be boresighted to the laser path to +/−35 μr. Boresight is the angle between crosshairs in the line of site of the telescope and that of the infrared laser beam.

DETAILED DESCRIPTION OF THE INVENTION

Figure 1:
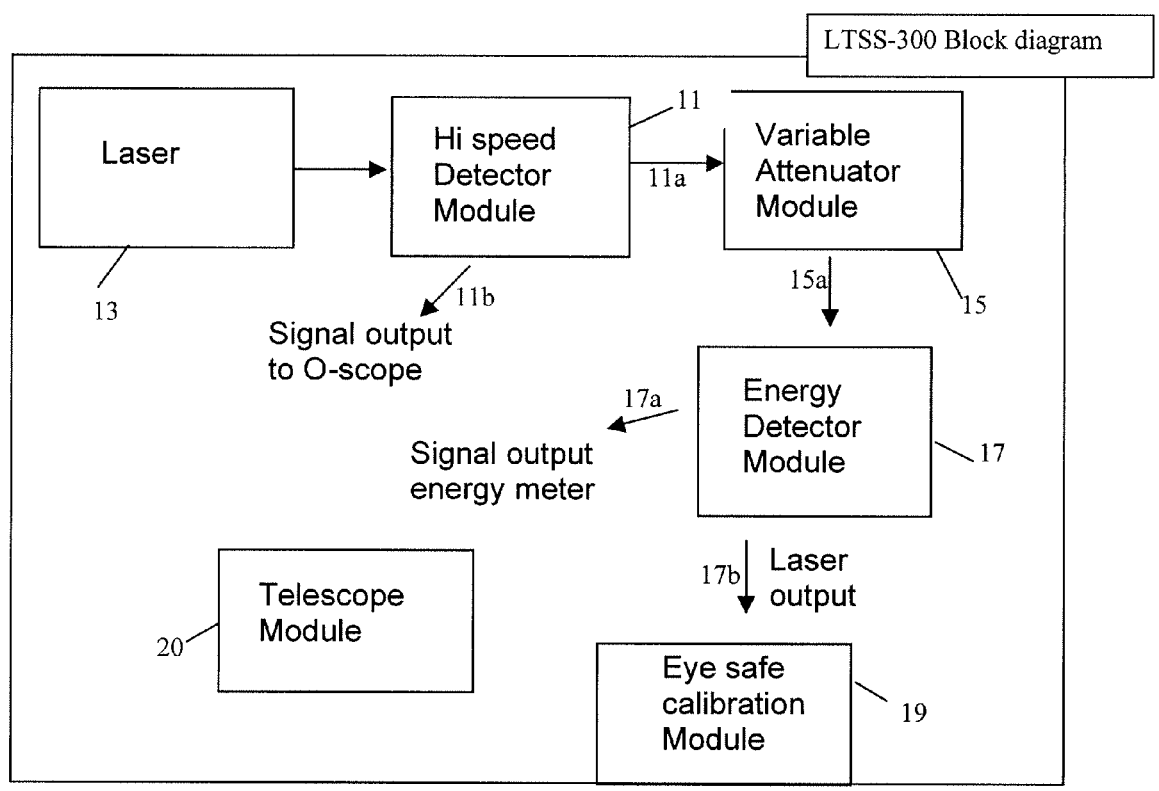
FIG. 1 is a block diagram of the invented system.

The invented system is illustrated in FIG. 1 and includes a high speed detector module 11 into which is input a laser 13 such as a CFR-400 from BigSky Laser. A variable detector module 15 receives a laser input 11a from high speed detector module 11 and provides an attenuated laser energy signal 15a to energy detector module 17. High speed detector module 11 also produces an energy output signal 11b. Eye safe calibration module 19 receives an attenuated laser energy signal 17b from energy detector module 17 which calibration module 19 uses to calibrate the system for laser energy.

When crosshairs in the telescope module 20 are aligned to the line of sight of the laser beam, the telescope module can be used to visually boresight the system, which in turn means that a visible reference can be used to align the system so that the laser will hit the desired point or target.

Figure 2:
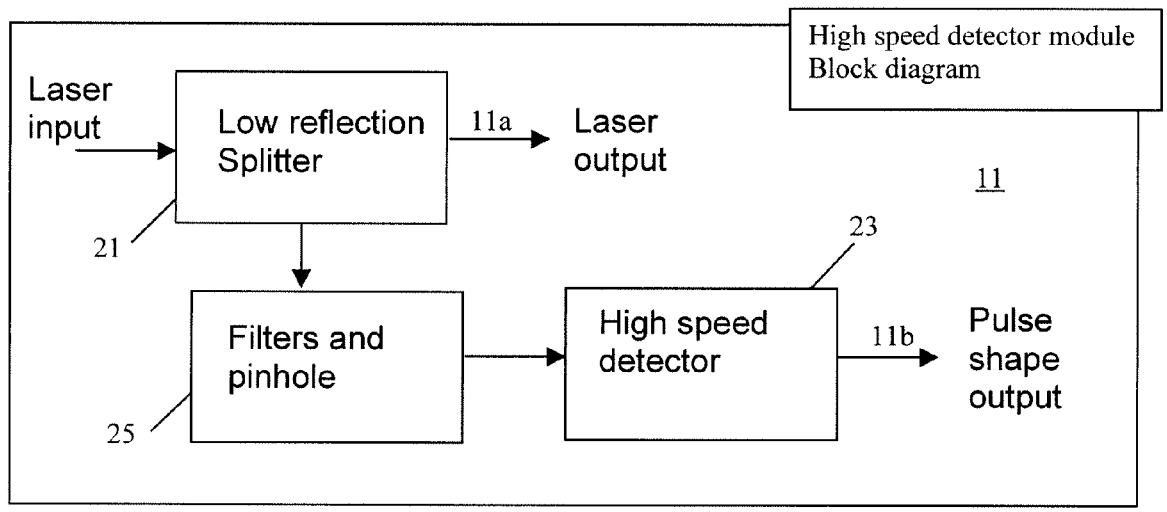
FIG. 2 is a block diagram of a high speed detector module according to the invention.

Referring to FIG. 2, the high speed detector module 11 is comprised of a beam splitter 21 coated for a very low reflection at 1.064 μm wavelength, a high speed detector 23 and various filters and pin hole 25.

The beam splitter 21 must be placed at an angle of 45 degrees relative to the laser input signal such that the reflected energy is at a 90 degree angle from the incident beam and so that the beam remains on the same plane as the incident beam. The high speed detector position and the filter selection combination is determined such that the signal 11b output from high speed detector 23 matches that of a calibrated high-speed detector reading of the laser output of the entire system as described below. Beam splitter 21 splits the input from laser 13 into a first laser output 11a which is provided to variable attenuator module 15 and a second laser output which is provided to filters and pinhole 25.

Filters and pinhole 25 are inserted in front of the detector 23 in order to attenuate the energy to a level compatible with the detector and to block reflections from entering the detector. The size of a neutral density filter and pinhole combination used by filters and pinhole 25 and positioning of the high speed detector 23 to the second laser output from module 15 are unique to each system and results in the output 11b from the detector 23 which is accurate relative to a pulse width detector external to the system to less than 1%. The specific combination of filters and pinholes required to produce this result can be readily determined by a person having ordinary skill in the field of the invention.

High speed detector 23 receives the laser output from filters and pinhole 25 and produces the pulse shape output 11b. All components of high speed detector module 11 must be aligned such that the pulse shape output has a range of 9 ns to 20 ns, 250 mv to 70 mv volts and which deviates from the true pulse width laser output 17a of the system by less than 1 ns.

The pulse shape output 11b by detector 23, such as part number ET2010 from Electro-Optics Technology, is used for a real time monitor of the pulse shape of the laser beam which exits the system. The invented system has output ports for energy and pulse width, and this output is the representation for the pulse width. Signal output 17a from energy detector module 17 in FIG. 1 is a representation of the energy of the laser output of the system.

Figure 3:
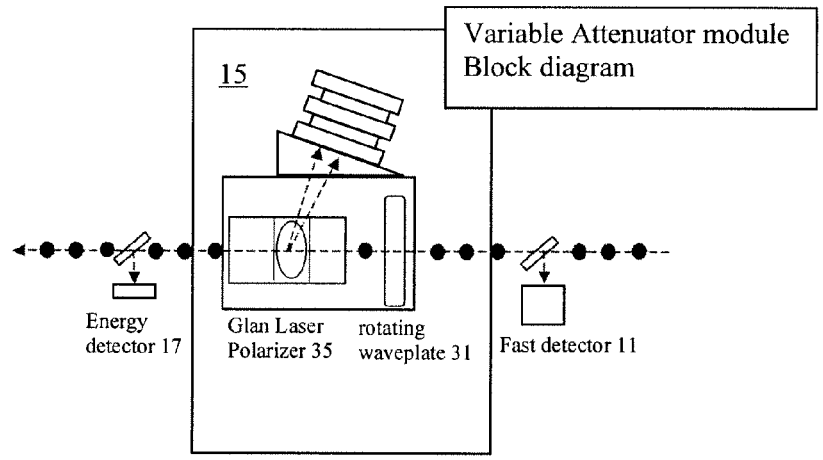
FIG. 3 is a block diagram of a variable attenuator module according to the invention.

Referring to FIG. 3, variable attenuator module 15 uses a rotatable zero-order half waveplate 31 to rotate the polarization of the laser output 11a by high speed detector module 11. The waveplate 31 is rotated manually or by use of a stepper motor until the desired energy level from the attenuator is achieved. This is acquired by observing the output from the energy detector module 17. The least amount of attenuation will give the operator the highest amount of energy output from the system, whereas various positions of rotation by the waveplate will produce various levels of attenuation and thus various levels of energy output for the operator to use. The maximum and minimum attenuation positions are determined and a mechanical stop is placed such that the waveplate cannot be turned past either point in each direction. Glan laser polarizing beam-splitter 35 is turned by 90 degrees for vertical polarized output. The Glan laser polarizer rejects the polarization that is not in the vertical. That is, any polarization at vertical is passed though and the rejected horizontal component is reflected into a beam dump 37. The beam dump is made with a cone shaped graphite that causes the beam to reflect inward and capture all of the high power energy with little back reflection into the Glan laser polarizing beam splitter 35.

Beam dump 37 must be positioned at an angle of roughly 25 degrees to capture and trap the two unwanted horizontal components of the laser from the Glan laser polarizer as shown in FIG. 3. The resulting output 15a is energy that is variable from 97% to 0.05% of the input. The Glan laser polarizer must be placed within the attenuator shell at the precise angle to get the maximum throughput and attenuation. This is determined by ordering a tilt in the mounting of the polarizer from the manufacturer and machining the attenuator shell such that it positions it at the same tilt. The entire module must be aligned precisely in order to get the maximum throughput and attenuation from the invented system. This is done by trial and error and then locked into place when achieved.

Figure 4:
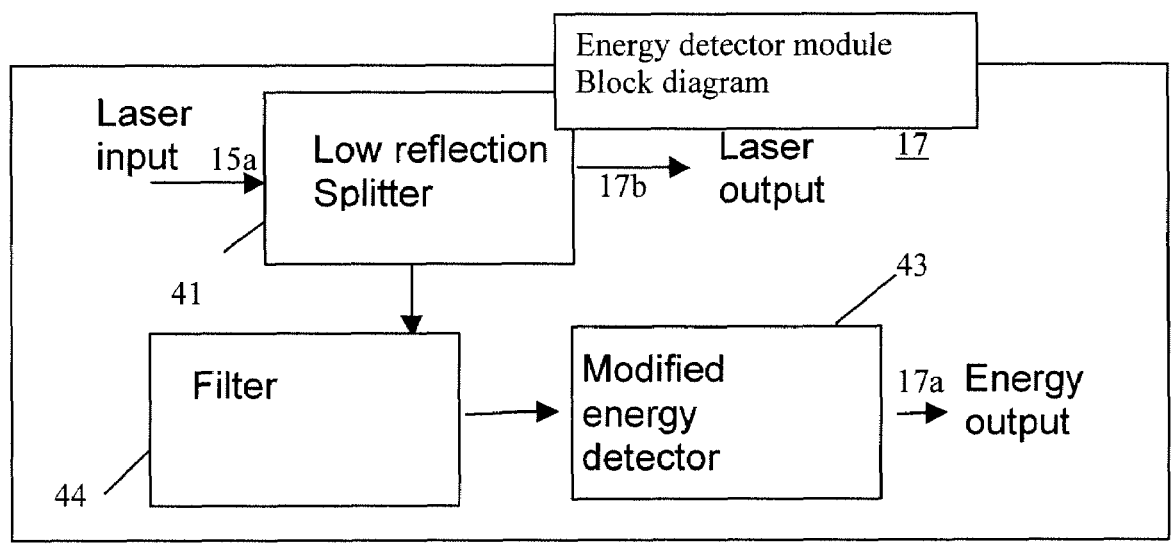
FIG. 4 is a block diagram of an energy detector module according to the invention.

The energy detector module 17 shown in FIG. 4 is comprised of a beam splitter 41 coated for a very low reflection at 1.064 µm, and a modified low profile energy detector 43 with a neutral density filter 44. The beam splitter 41 must be placed at 45 degrees such that the reflected energy is at a 90 degree angle from the incident beam and so that the beam remains in the same plane as the incident beam and such that all of the energy is incident on the detector active area of detector 43. The beam splitter 41 splits the laser output 15a by variable attenuator module 15 into first and second beams and directs one beam as laser output 17b shown in FIG. 1. The second beam 17c is sent to modified energy detector 43 through filter 44 which receives the laser output from splitter 41 and produces a voltage output 17a that is representative of the energy of the laser. This output is displayed by an energy meter (not shown) which indicates what the energy output of the entire system is, which is based on the known beam splitter ratio between the first beam 17b and second beam 17c. Energy detector module 17 includes a neutral density filter 44 which is chosen with a value that will ensure a range of energy that is incident on the modified energy detector 43 that is in the upper linear region and at the same time remains below the levels where damage could be induced to the active surface of the modified energy detector. Energy detector 43 may be implemented with part number J8LP-0860 from Coherent, Inc. which is modified by inserting an ANG-27-0.50 filter from CVI Melles Griot.

The eyesafe calibration module 19 incorporates two internal switches (not shown) which are connected to the interlock of the laser system and are used such that when a detector is placed into the module 19, the switches will engage and allow the invented system to output energy in the form of laser output 17b. The calibration module is mounted to receive the output 17b of the invented system and ensures an eyesafe connection and proper alignment such that the energy from the system will enter the detector and be contained so that it will not injure an operator who does not have laser eye protection in place. The calibration module uses an adapter that holds the detector in place and blocks and contains all the laser energy inside of the adapter and detector. The calibration is performed by comparing the laser energy readout values from energy output 17a with that of the calibration module 19. It is only used for calibration of the system. In normal operation of the system, the output beam 17b must either be protected against with proper laser eye protection or with some type of laser blocking adapters.

Operational details of the invented calibrated high energy laser source are as follows.

The invented system must first be calibrated by comparing a known energy standard with the signal 17a which is output to an energy meter which is used to make the comparison. The appropriate calibration factor is inserted into the meter such that the two readings match to within 1 percent. Once the two readings match, the laser source is calibrated and ready for use. The high speed detector output 11b is connected to and monitored by a 500 MHz or better oscilloscope. The invented system can then be used as calibration tool for testing laser designator test sets by firing various levels and pulse widths of known and calibrated energy levels and pulse widths into the test set.

If the invented system is to be used in applications where boresight is a requirement, then the telescope module 20 must be attached to the system and boresighted (or aligned) such that it is parallel to the laser output beam 17b to within +/−35 microradians. The invented system can then be used as calibration tool for testing the boresight of laser to FUR boresight test sets, or to calibrate laser designator/rangefinder test sets by using the boresight to properly align the test set, then by firing various levels and pulse widths of known and calibrated energy levels into the test set, comparing the value that the test set measures against the readout form the 17a and 11b. The telescope is used to ensure the laser beam is hitting the proper portion of the test set and/or to check the boresight of the test set. The various test sets that are calibrated by this invention are used to test the functionality of laser designator and rangefinder weapons. It can also be used as a limited range of 1.57 um and 1.54 um wavelengths of laser outputs though the use of pre-aligned optical parametric oscillator modules that precisely mate to the faceplate of a device corresponding to the invented method and apparatus.

I claim:

1. A system for calibrating laser designator and rangefinder test sets comprising:
    a) a high speed detector module (11) which receives a laser input signal, and outputs a laser output signal (11a) and an electrical pulse shaped output (11b);
    b) a variable attenuator module (15) which receives said laser output signal (11a), said variable attenuator module including:

i) a rotating waveplate (31) which rotates a polarization of the received laser output signal (11*a*), and ii) a Glan laser polarizing beam splitter (35) which receives the rotated laser output signal (11*a*), said polarizing beam splitter passing only vertically polarized portions (15*a*) of said rotated laser output signal;

c) an energy detector module (17) receiving said vertically polarized portions of said rotated laser output signal and including:

a beam splitter (41) which splits said vertically polarized portions of said rotated laser output signal into a first path pulse (17*c*) and a second path pulse (17*b*), said second path pulse used to calibrate a laser designator/rangefinder test set.

2. The system defined by claim 1 where said high speed detector module (11) comprises:

a) a second beam splitter (21) which splits said laser input signal into a third path pulse and a fourth path pulse, said third path pulse corresponding to said laser output signal (11*a*), b) filters and pinhole (25) into which said third path pulse is directed and output as a filtered laser signal, and c) a high speed detector (23) which receives said filtered laser signal and outputs said electrical pulse shaped output (11*b*).

3. The system defined by claim 2 wherein said energy detector module further comprises:

a) a filter (44) into which the first path pulse (17*c*) is directed and output at a reduced power level, and b) an energy detector (43) which receives said reduced power level output as an input and which operates to produce an energy output (17*a*) based on said received first path pulse.

4. A system for calibrating laser designator and rangefinder test sets comprising:

a) a high speed detector module (11) which receives a laser input signal, said module including:

i) a beam splitter (21) which splits said laser input signal into a first path pulse and a second path pulse (11*a*), ii) filters and pinhole (25) into which said first path pulse is directed and output as a filtered laser signal, and iii) a high speed detector (23) which receives said filtered laser signal and outputs an electrical pulse shaped output (11*b*);

b) a variable attenuator module (15) which receives said second path pulse (11*a*), said variable attenuator module including:

i) a rotating waveplate (31) which rotates a polarization of the received second path pulse, and ii) a Glan laser polarizing beam splitter (35) which receives the rotated second path pulse and splits the rotated output into a third path pulse (15*a*) and a fourth path pulse, said polarizing beam splitter passing only vertically polarized portions of said rotated second path pulse as said third path pulse, horizontally polarized portions of said pulse shaped output being reflected inward by said polarizing beam splitter and output as said fourth path pulse to a beam dump (37);

c) an energy detector module (17) receiving said third path pulse (15*a*) and including:

i) a beam splitter (41) which splits said third path pulse into a fifth path pulse (17*b*) and a sixth path pulse (17*c*), said fifth path pulse (17*b*) being a laser output, and ii) a filter (44) into which the sixth path pulse is directed and output at a reduced power level, and iii) an energy detector (43) which receives said reduced power level output as an input and which operates to produce an energy output (17*a*) based on said received sixth path pulse;

wherein the fifth path pulse (17*b*) is used to calibrate a laser designator/rangefinder test set.

5. The system defined by claim 1 wherein said rotation waveplate is rotated until a desired energy level is acquired which is read as an output from the energy detector module (17) based on said first path pulse (17*c*).

6. The system defined by claim 5 wherein said waveplate is rotated manually.

7. The system defined by claim 5 wherein said waveplate is rotated using a stepper motor.

8. The system defined by claim 4 wherein said rotation waveplate is rotated until a desired energy level is acquired which is read as an output from the energy detector module (17) based on said sixth path pulse (17*c*).

9. The system defined by claim 8 wherein said waveplate is rotated manually.

10. The system defined by claim 8 wherein said waveplate is rotated using a stepper motor.

11. A method for calibrating laser designator and rangefinder test sets comprising:

a) receiving a laser input signal, and outputting a laser output signal and an electrical pulse shaped output;

b) receiving said laser output signal;

c) rotating a polarization of the received laser output signal;

d) receiving the rotated laser output signal and passing only vertically polarized portions of said rotated laser output signal;

e) receiving said vertically polarized portions of said rotated laser output signal;

f) splitting said vertically polarized portions of said rotated laser output signal into a first path pulse and a second path pulse, g) using said second path pulse and the electrical pulse shaped output to calibrate a laser designator/rangefinder test set.

12. The method defined by claim 11 further comprising:

a) splitting said laser input signal into a third path pulse and a fourth path pulse, said third path pulse corresponding to said laser output signal, b) outputting a filtered laser signal, and c) receiving said filtered laser signal and outputting said electrical pulse shaped output.

13. The method defined by claim 12 further comprising a) a filtering the first path pulse and outputting said first path pulse at a reduced power level, and b) receiving said reduced power level output and producing an energy output based on said received first path pulse.

* * * * *